(12) United States Patent
McFarland

(10) Patent No.: US 6,409,196 B1
(45) Date of Patent: Jun. 25, 2002

(54) WHEELCHAIR FRONT FORK

(76) Inventor: Ryan J. McFarland, 38 Mount Rushmore Rd. #3, Custer, SD (US) 57730

(*) Notice: Subject to any disclaimer, the term of this patent is extended or adjusted under 35 U.S.C. 154(b) by 0 days.

(21) Appl. No.: 09/444,397

(22) Filed: Nov. 22, 1999

(51) Int. Cl.$^7$ ............................................... B60B 33/00
(52) U.S. Cl. ......................................... 280/250.1; 16/44
(58) Field of Search ........................... 280/250.1, 304.1, 280/124.177; 16/19, 44, 18 R

(56) References Cited

U.S. PATENT DOCUMENTS

| | | | |
|---|---|---|---|
| 1,745,992 A | * 2/1930 | Herold | |
| 2,227,875 A | * 1/1941 | Boden | |
| 2,526,866 A | * 10/1950 | Hersey et al. | |
| 2,753,946 A | * 7/1956 | Quayle | |
| 2,885,720 A | * 5/1959 | Seeberger | |
| 4,462,138 A | * 7/1984 | Black | 16/44 |
| 4,485,521 A | * 12/1984 | Welch et al. | 16/44 |
| 4,559,669 A | * 12/1985 | Bonzer et al. | 16/44 |
| 5,347,680 A | * 9/1994 | Rippe | 16/19 |
| 5,360,224 A | * 11/1994 | Geiger et al. | 280/250.1 |
| 5,394,589 A | * 3/1995 | Braeger et al. | 16/44 |

FOREIGN PATENT DOCUMENTS

| | | | | |
|---|---|---|---|---|
| FR | 852602 | * | 2/1940 | 16/44 |
| FR | 2399328 | * | 4/1979 | 16/44 |
| IT | 534585 | * | 10/1955 | 16/44 |

* cited by examiner

*Primary Examiner*—Anne Marie Boehler

(57) ABSTRACT

This invention provides a wheelchair small wheel suspension system which optimizes parameters of height, trail, and forward extension of the small wheels to provide a wheelchair with maximum stability and ability to negotiate rough surfaces. This suspension system is applicable to both manual and powered chairs. It uses an elastomer block to cushion the impact of road surface imperfections. The location of the elastomer block with respect to the wheel and the system's connection to the wheelchair frame is an important aspect of this invention. Tuning of the wheelchair suspension system to meet the individual user's requirements is easily accomplished using this suspension system.

6 Claims, 11 Drawing Sheets

WHEELCHAIR FRONT FORK

FIELD OF THE INVENTION

This invention relates to wheelchairs with two large wheels and two small wheels and to suspension systems for the small wheels.

BACKGROUND OF THE INVENTION

Providing a suitable shock absorbing suspension system for the small wheels of wheelchairs has been an ongoing problem. A suitable system will maximize the functionality of the wheel chair through minimal suspension system height to provide better chair stability, minimal forward extension in front of the wheel in order to avoid collision with chairs, tables, curbs and other obstacles, and minimal trailing of the small wheel to avoid loss of stability and avoid contact between the small wheel and the chair and or rider when making turns, while using the largest diameter for the small wheels as is practical.

The suspension system of the present invention was designed to solve problems with prior art suspension systems concerning the height of the suspension system, the trail of the small wheels, the forward extension of the suspension system and the ease of tuning of the suspension system. In addition, the present invention allows the use of small wheels of maximum practical diameter.

U.S. Pat. No. 4,132,423 discloses a strut extending before the small front wheels of wheelchairs having an arcuate rocker end and attached to the wheelchair by a prestressed spring. The strut engages the curb and lifts the small wheelchair wheels, allowing the wheelchair to mount the curb.

U.S. Pat. No. 4,455,031 discloses independent front wheel suspension for a wheelchair. Each front wheel is mounted on an arm which extends from the front wheel across the width of the wheelchair to a location near the other front wheel where the arm is pivotally attached the frame. A coil spring attached to the arm and wheelchair frame near the front wheel provides cushioning.

U.S. Pat. No. 4,572,533 discloses wheelchair front wheels attached to the frame via a tubular shock absorber with coil springs arranged above and below the attachment point of the wheels to the frame.

U.S. Pat. No. 5,464,271 discloses a bicycle seatpost having an upper and a lower piece joined by a pivot pin. A spring biases the two pieces apart. The pieces oscillate with alternate compression and expansion of the spring as the bicycle traverses a bumpy road. The scope of the oscillation is limited by a bolt which connects the pieces and extends through a slot in the arms of the upper piece.

U.S. Pat. No. 5,489,139 discloses a bicycle seatpost with two linkages in the form of a parallelogram and an elastic block which connects two parallel sides of the structure. Compression and expansion of the elastic block results in a smooth ride over rough terrain.

U.S. Pat. No. 5,848,658 discloses a power wheelchair with a stabilizer mechanism for the non-steering front wheels. The mechanism is constructed of an upwardly inclined spring loaded arm connected to the front wheel axle and an approximately horizontal arm also connected to the wheel axle at one end and connected to the frame through a spring loaded shock absorber at the other end.

Invacare Corporation, Elyria, Ohio, produces the INVACARE TOP END TERMINATOR SS everyday chair with FROG LEG suspension castors, which support the front wheels. Each of the front wheels has a polymer shock absorber located directly below the swivel attachment of the wheel to the chair frame.

None of the prior art small wheel suspension systems provide the advantages of the present invention, which includes minimal suspension height, minimal protrusion forward of the vertical connector, and minimal trailing of the wheel during chair movement, combined with the maximum wheel diameter practical.

SUMMARY OF THE INVENTION

The invention is a wheel suspension system in which a frame member is suspended by a lower portion to a receptor which swivels about a vertical axis, a wheel axle is spaced from the receptor and pivotally connected to it by a link, the receptor and link having an internal space into which an elastomer block is fitted, and the elastomer block is positioned adjacent to the vertical axis.

In particular, the invention is a small wheel suspension system for wheelchairs having a wheelchair frame. The system comprises a wheel which rolls along the ground and supports the wheelchair. A link having at least one arm is attached to the wheel axle.

The link is attached to a receptor by a pivot pin and the receptor is attached to the wheelchair frame by a vertical connector. The receptor swivels about the vertical connector when the chair changes direction of movement and the wheel so that the wheel axle is behind the vertical connector when the wheelchair is in motion. The link is pivotally connected to the receptor by a horizontal pivot pin, the link pivoting from its position when the wheel encounters an obstacle. An elastomer block positioned between the link and receptor cushions the pivoting of the wheel and link, the elastomer block being compressed when the link pivots. The compressed elastomer block biasing the link toward its original position. The elastomer block is positioned above the wheel axle, before or below the receptor pivot pin, and before the vertical connector when the wheelchair is in motion.

This invention includes a new suspension system for the small wheels of a wheelchair or other similar vehicle. In such a system, a portion of the wheelchair, at the front or rear, is supported by small wheels, which are attached by an axle to a link, generally fork shaped, with one arm on either side of the wheel. Optionally, a link can have only one arm. A receptor is attached to the wheelchair frame and swivels about a vertical connector, which may be a stembolt, thereby allowing the wheel to swivel in order to change the direction of the wheelchair movement. The wheel trails during wheelchair motion, that is, the wheel axle is behind the connector during movement of the chair. The link is attached to the receptor by a pivot pin extending through a hole in the receptor so that the link with attached wheel pivots upward toward the frame and generally toward the rear of the chair when the chair is moving forward and the wheel encounters an obstacle on the ground, such as a rock or unsmooth pavement. Pivoting also occurs to a lesser degree in normal use due to the weight of the user. This pivoting motion of wheel and link is termed "deflection." In this application, the convention will be followed of designating the rotation of a wheel as clockwise when a wheel on the wheelchair is viewed from the right side of the chair and the chair is moving forward, that is, in the direction the chair occupant is facing. In the first three embodiments, the pivot pin which connects the link and receptor is located in front of the vertical connector when the chair is moving forward. An elastomer block is positioned between the receptor and the link so that the elastomer block is compressed when the link and wheel pivots upward toward the wheelchair frame. The elastomer block also biases the wheel downward toward the ground and toward the front of the wheelchair in a counterclockwise motion. In the first three embodiments, the elastomer block is positioned between the receptor and link above the wheel axle, below the receptor pivot pin and before the vertical connector.

A fourth embodiment suspension system maximizes the diameter of the small wheel while retaining the lower system height and other advantages of the first three embodiments. Small wheels of a relatively greater diameter are especially appropriate for powered wheelchairs. In this fourth embodiment, the pivot pin is located directly under the vertical connector while the elastomer block is located above the wheel axle, in front of the pivot pin and before the vertical connector. The elastomer block may be tilted, as in the first three embodiments. This allows the use of a small wheel of maximum diameter.

Adaptation of the wheelchair characteristics to the requirements of the individual user is termed "tuning." This suspension system is designed to facilitate tuning the system. This system optimizes the amount of trail of the front wheel in order to maintain support under the front of the chair, and to avoid contact between the small wheels and the chair occupant. This system minimizes the height of the suspension system in order to maintain stability of the wheelchair. Finally, this system minimizes the extension forward of the vertical connector in order to reduce contact with obstacles in front of the chair.

One objective of the invention is to provide for easy replacement of the elastomer block to facilitate tuning of the system.

Another objective is to reduce the height of the suspension to maintain stability of the wheelchair.

Another objective is to reduce the trail of the small wheels to maintain the support of the wheelchair and to avoid contact between the wheels and the chair occupant or the chair structure when making a turn.

Another objective is to reduce the forward extension of the suspension system to avoid contact with obstacles before or behind the chair.

Another objective is to facilitate the installation of wheels of various diameters to facilitate tuning of the system.

Another objective is to allow the use of maximum diameter small wheels without interference between the wheels and receptor at maximum wheel deflection.

A final objective of the invention is to provide a small wheel suspension system, which is inexpensive, easy to manufacture, and without adverse effect on the environment.

DETAILED DESCRIPTION OF THE INVENTION

In this application, the convention will be followed of designating rotation in a clockwise direction when a wheel on the right side of the wheelchair is viewed from the right side of the chair and the chair is moving forward.

Figure 1:
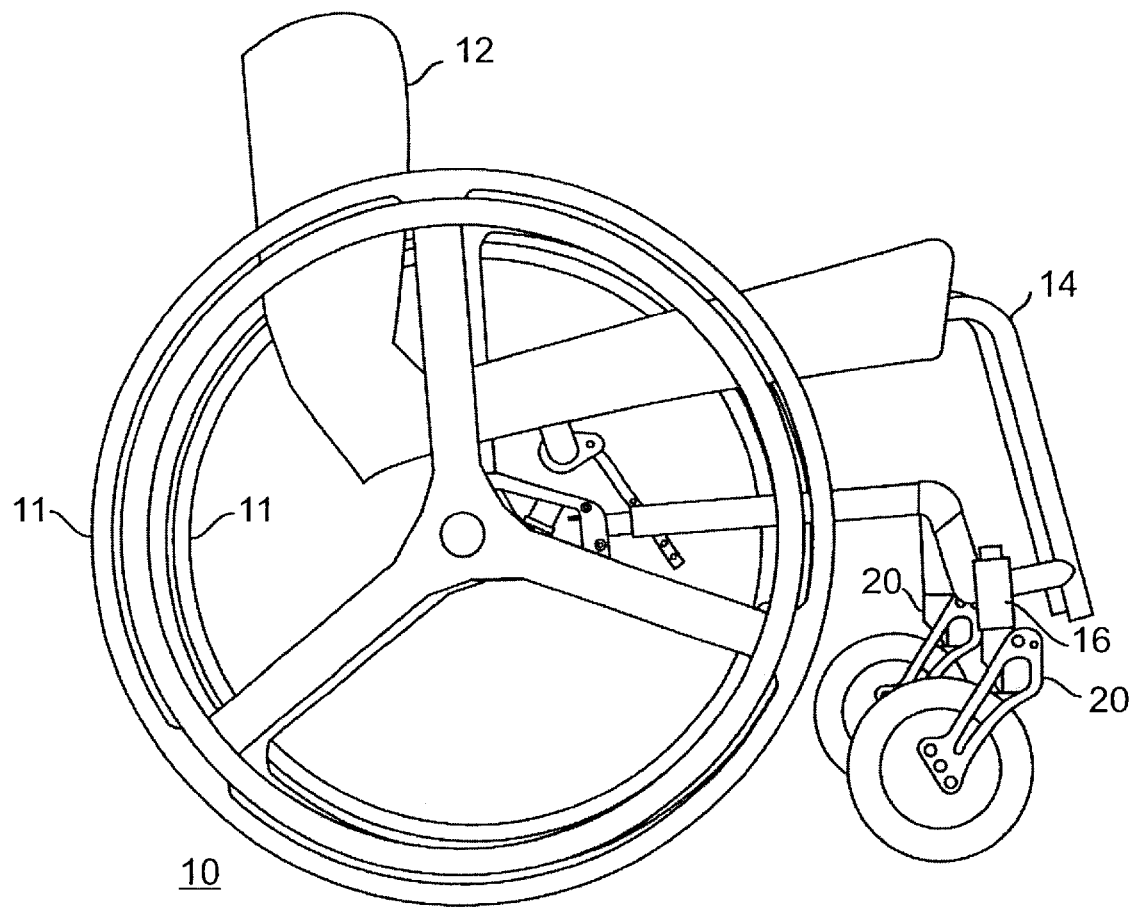
FIG. 1 is a side view of a wheelchair with the small wheel suspension of the present invention.

FIG. 1 shows a wheel chair 10 with the small wheel suspension system 20 of this invention. Also shown are the large wheels 11, frame 14, seat 12 supported by frame 14, and small wheel mount socket 16, which is attached to the frame 14, and to which the small wheel suspension system 20 is attached. In FIG. 1 the small wheels are the front wheels. Other configurations are possible, in particular, the small wheels may be at the rear of the wheelchair, especially in powered wheelchairs. The suspension system is connected to the frame by a vertical connector which allows the suspension system to swivel. In the embodiments described below, the vertical connector is a stembolt which is a part of the receptor. Other ways of connecting the small wheel suspension system 20 to the frame 14 may be used, for example, a bolt from the frame might extend through a bushing in the suspension system.

Figure 2:
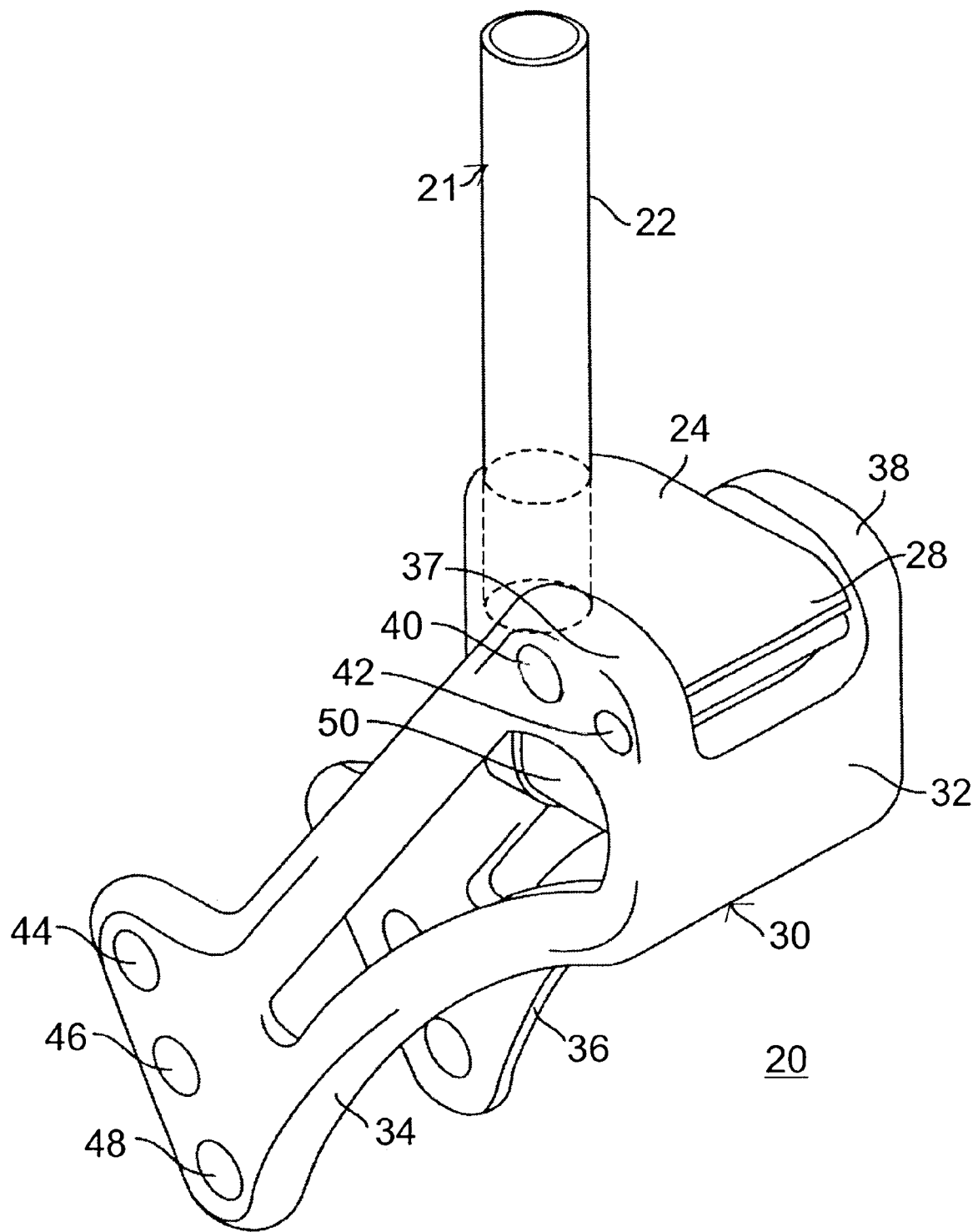
FIG. 2 is a perspective view of the first embodiment link and receptor of the small wheel suspension system.

FIG. 2 is a perspective view of the first embodiment receptor 21 and link 30 of the suspension system 20. The complete suspension system includes the small wheel (not shown in FIG. 2), elastomer block 50, receptor 21, and link 30. The receptor 21 is shown with stembolt 22 and receptor body 24. The stembolt 22 fits into and is pivotally mounted to the small wheel mount socket (16 in FIG. 1). This swiveling of the stembolt 22 in the socket (16 in FIG. 1) allows the small wheel suspension systems and thus the small wheels to pivot when the wheelchair is turned. The fork-shaped link 30 is shown with the link front 32 and left arm 36 and right arm 34. Axle holes 44, 46, 48 are shown in the right arm 34. Similar holes are in the left arm 36. In use, the wheel is inserted between the arms and the axle of the 3" diameter wheel is inserted into hole 48, the axle of a 4" diameter wheel into hole 46, and the axle of a 5" diameter wheel into hole 44. These combinations of wheel sizes and holes in use all leave the seat of the wheelchair at approximately the same height above the ground. Larger wheel diameters, for example, 8" or 9", are often used with powered wheelchairs. The suspension system of this invention is also useful with such larger wheels.

"Tuning" the chair suspension refers to adjustments made to personalize the chair for the weight and height of the user and for the conditions under which the chair is typically used. For tuning purposes, putting a 5" wheel axle in hole 48 raises the chair height by 1" for use by taller persons. Putting a 3" wheel axle in hole 44 lowers the chair height by 1" for use by shorter persons. Moving the 4" wheel to position 48 raises the chair by ½" and moving that wheel to position 44 lowers the chair by ½". In general, smaller diameter wheels are lighter and quieter, while larger wheels provide a smoother ride over rough surfaces. For example, the seat height is unchanged when a 3" wheel axle is installed in the lowest hole or when a 5" wheel axle is installed in the highest hole. The chair would be tuned for smooth surfaces in the former case and for rough surfaces in the latter. Adjustment of the elastomer block provides another element of tuning and is discussed below.

Opposite the arms 34 and 36 on the link 30 are a left ear 38 and right ear 37. These ears extend over the receptor body 24 when the suspension system is assembled. A pivot pin 40 extends through holes in the ears 37 and 38 and through a hole in the receptor (not shown in FIG. 2). The link thus is able to pivot about the pivot pin 40.

A finger 28 extends from the receptor body 24 and is about perpendicular to the stembolt 22. A stop pin 42 extends through holes in the ears 37 and 38. The stop pin 42 bears against the finger 28 and limits the pivoting of the link away from the frame in the downward, forward, or counterclockwise direction.

An elastomer block 50 is shown locked in position between the receptor 21 and link 30. The elastomer block is compressed by pivoting of the link toward the frame in upward, backward, or clockwise direction and limits such pivoting. The elastomer block also biases the link away from the frame in the downward, forward, or counterclockwise direction.

When the wheelchair is in operation, the contact of a front wheel with a rock or other obstacle on the road surface causes the link to pivot toward the frame in an upward, backward, or clockwise direction, termed "deflection", causing compression of the elastomer block, and cushioning the impact of the rock or other obstacle. The compressed elastomer block biases the link away from the frame in the downward, forward, or counterclockwise direction, thereby maintaining contact between the wheel and the road surface, and avoiding shimmy or loss of control associated with momentary loss of contact with the road surface.

Replacement of the elastomer block 50 is easy and convenient. This is done when the block is worn out. In addition, one block is replaced with another one of different resilience, in order to tune the wheelchair suspension for the individual user. For example, a relatively heavy user would prefer a firmer elastomer block than that used by a relatively light user. Replacement is achieved by withdrawing the stop pin 42 and rotating the link in the downward, forward or counter-clockwise direction until the elastomer block 50 is freed, replacing the block with a new one, rotating the link in the upward, rearward, or clockwise direction, and replacing the stop pin 42. It is not necessary to remove the suspension system from the wheelchair. Thus the suspension system can be easily and conveniently maintained and tuned by the user.

Figure 3:
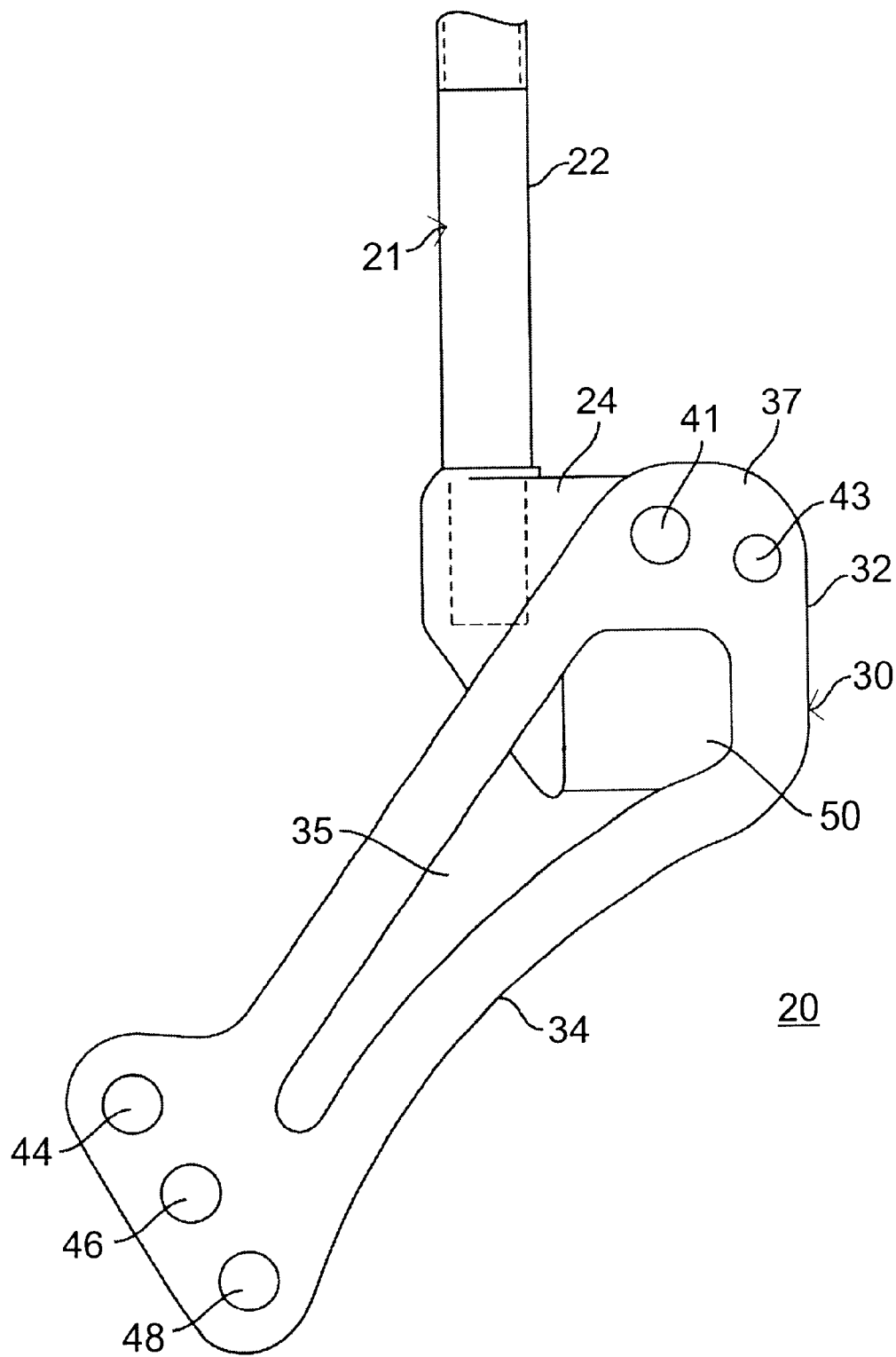
FIG. 3 is a side view of the first embodiment link and receptor of the small wheel suspension system.

FIG. 3 is a side view of the first embodiment receptor 21 and link 30 of the suspension system. The receptor 21 with stembolt 22 is shown attached to the receptor body 24. The pivot pin is not shown but the pivot pin hole 41 on the right ear 37 is visible. Similarly, the stop pin hole 43 on the right ear 37 is visible. Also depicted is the front 32 of the link 30. The right arm 34 is shown along with cutout 35. The purpose of the cutout 35 is to reduce the weight of the system but, of course, it is not essential to the system. The axle holes 44, 46, and 48 are shown on the right arm 34. The elastomer block 50 is shown in position trapped between the receptor 21 and link 30.

Figure 4:
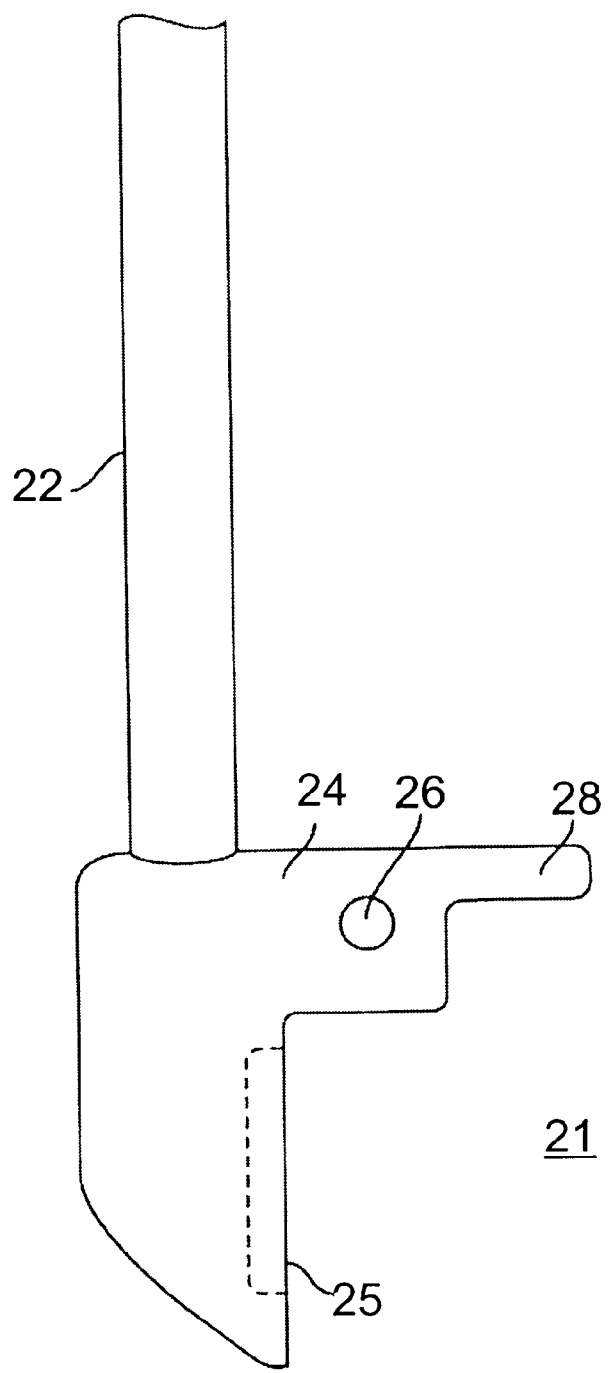
FIG. 4 is a side view of the receptor of the first embodiment small wheel suspension system.

FIG. 4 is a side view of the first embodiment receptor 21. The stembolt 22 is shown attached to the receptor body 24. The pivot pin bore 26 is located in the receptor body 24. The finger 28 extends ahead of the receptor body 24, is about perpendicular to the stembolt 22, and interacts with the stop pin on the link to restrain pivoting of the link away from the frame in downwardly in the counterclockwise direction. The elastomer block seat 25, a machined depression, on the receptor 21 is also shown. A corresponding elastomer block seat 127 on the link 130 is shown on FIG. 6. Although the elastomer block seats here are machined depressions, other ways of retaining the elastomer block may be used, such as a pins protruding from the receptor and link which mate with corresponding holes in the elastomer block.

Figure 5:
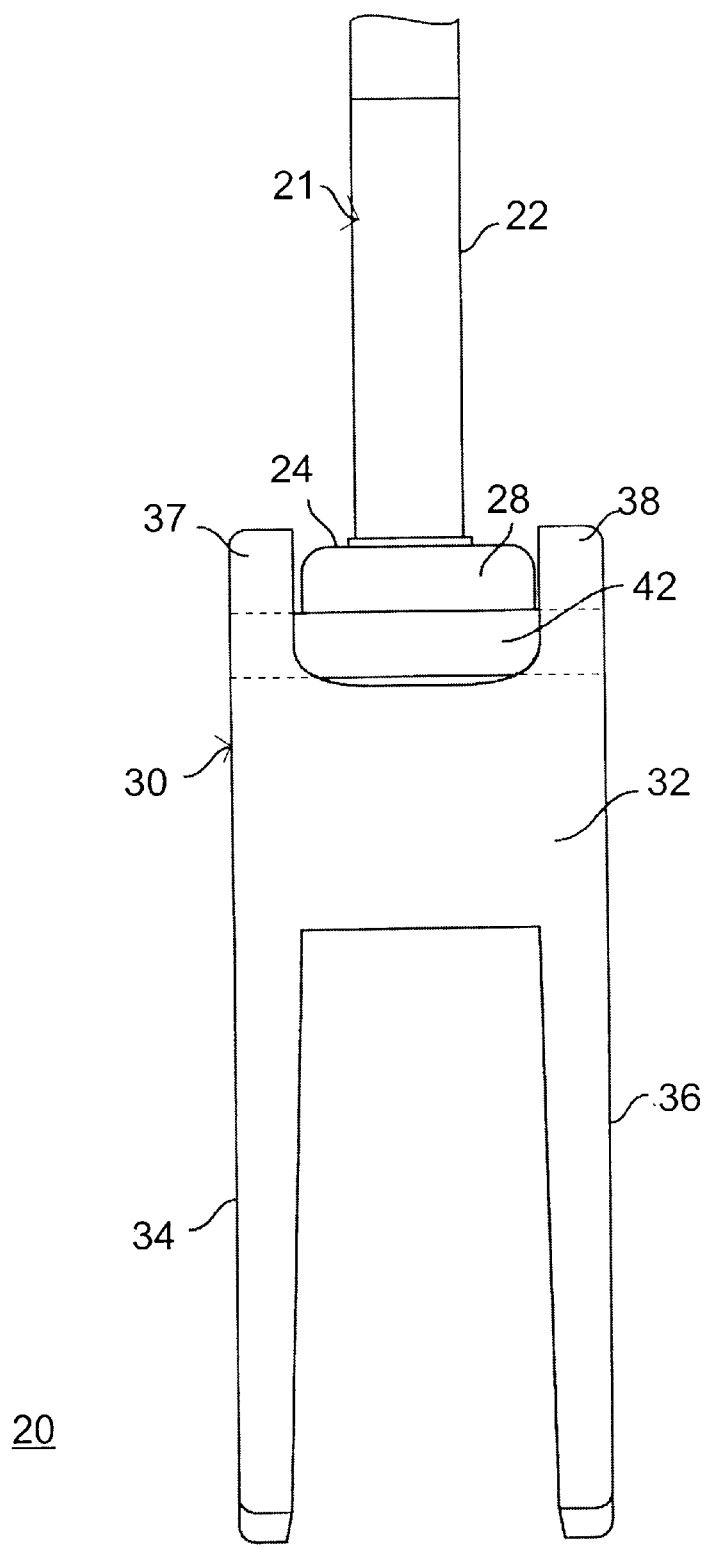
FIG. 5 is a front view of the first embodiment link and receptor of the small wheel suspension system.

FIG. 5 is a front view of the receptor 21 and link 30 of the suspension system 20. The stembolt 22 of the receptor 21 is shown with only the finger 28 of the receptor 24 visible. The link 30 is shown with the right arm 34 and left arm 36 on one end and the left ear 38 and right ear 37 on the other end. The front 32 of the link is visible, as is the stop pin 42.

Figure 6:
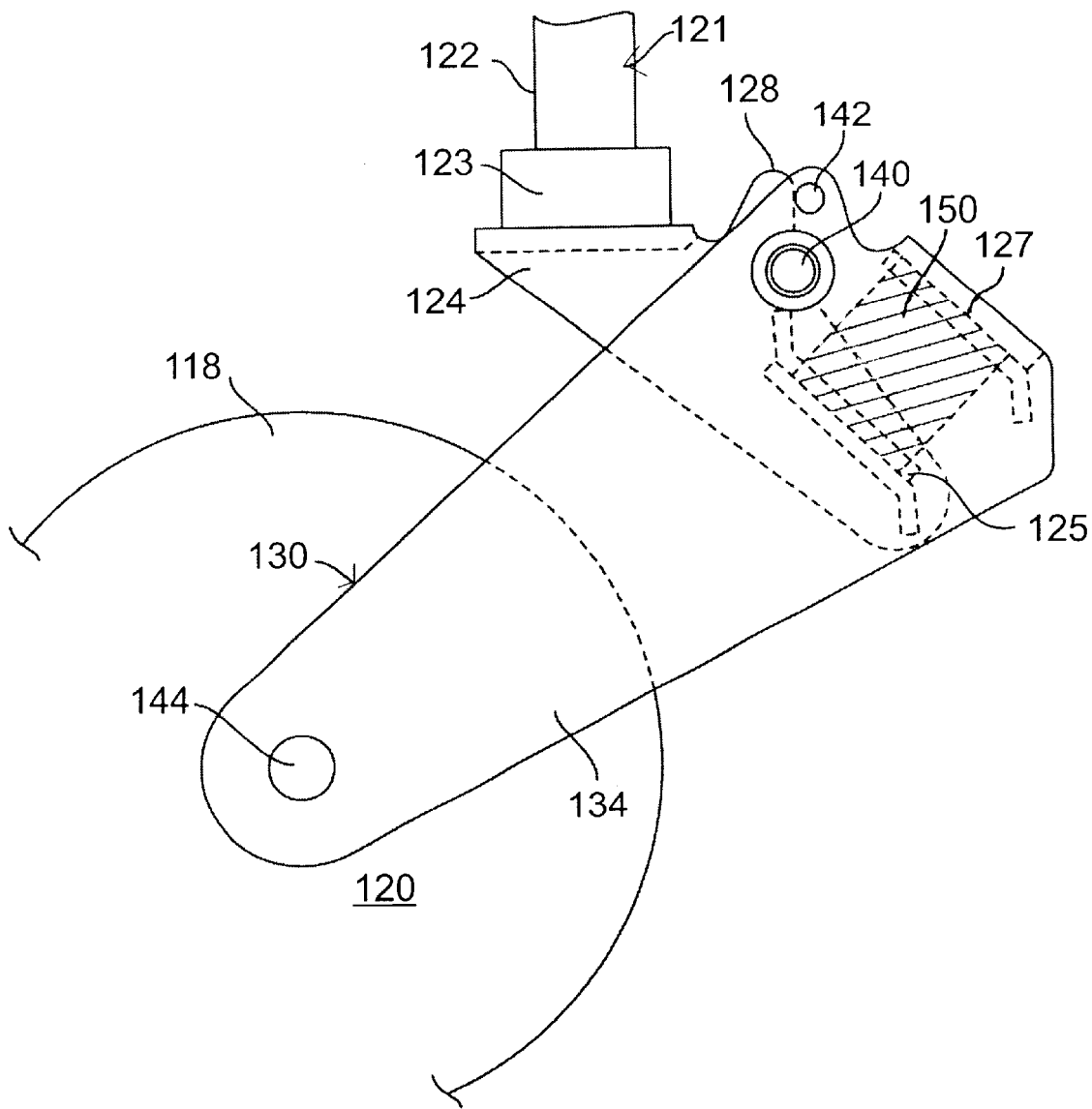
FIG. 6 is a side view of the second embodiment small wheel suspension system.

FIG. 6 is a side view of the second embodiment suspension system 120, which includes the wheel 118. The stembolt 122 is connected to the stembolt head 123 which is connected to the receptor 121 and is shown along with the receptor body 124 and the finger 128. The elastomer block 150 is shown with dashed lines because it is covered by the link 130 and is trapped between the link 130 and receptor body 124. Dashed lines also depict the link elastomer block seat 127 and the receptor elastomer block seat 125. The link 130 is shown with right arm 134 and axle hole 144. The link is pivotally attached to the receptor by pivot pin 140. Note that the pivot pin 140 is located well before the stembolt 122 and stembolt head 123. The counterclockwise rotation of the link away from the frame and downward is limited by the stop pin 142 removably mounted on the link 130. Stop pin 142 bears against the finger 128 on the receptor body 124. Removal of the stop pin 142 allows counterclockwise rotation of the link downward and frontward and convenient replacement of the elastomer block or blocks 150. Note that in this second embodiment the top of the elastomer block is oriented at an angle of about 45° to the horizontal rather than perpendicularly, as in the first embodiment. This orientation of the elastomer block allows use of a larger diameter wheel without raising the overall height of the suspension system.

Figure 7:
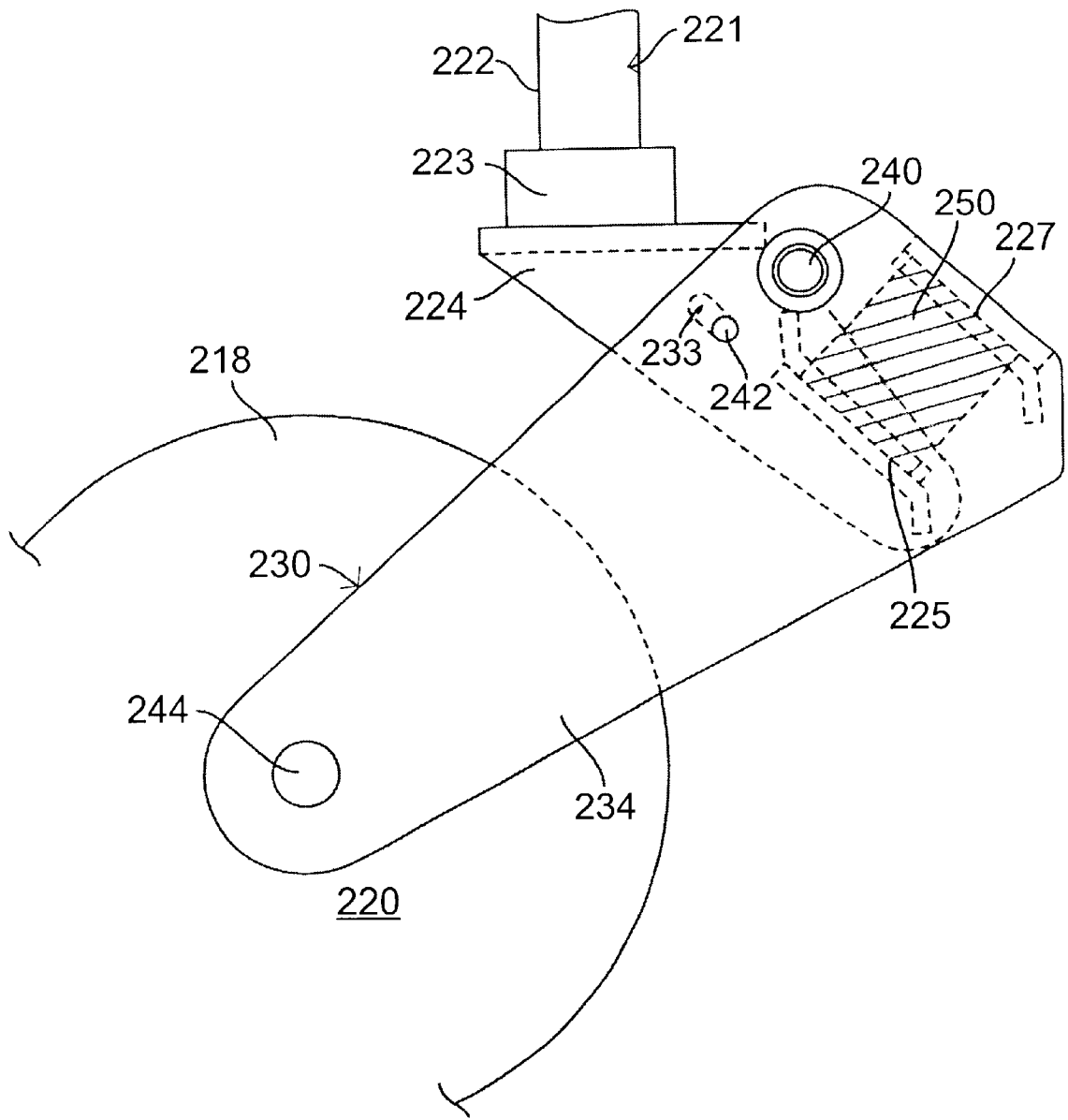
FIG. 7 is a side view of the third embodiment small wheel suspension system.

FIG. 7 is a side view of the third embodiment suspension system 220, which includes the wheel 218. The stembolt 222 is connected to the stembolt head 223 which is connected to the receptor 221 and is shown along with the receptor body 224. The elastomer block 250 is shown with dashed lines because it is covered by the link 230 and is trapped between the link 230 and receptor body 224. Dashed lines also depict the link elastomer block seat 227 and the receptor elastomer block seat 225. The link 230 is shown with right arm 234 and axle hole 244 and wheel 218. The link 230 is pivotally attached to the receptor body 224 by the pivot pin 240 which is located well before the stembolt 222 and stembolt head 223. The counterclockwise rotation of the link 230 downwardly or forwardly is limited by the stop pin 242 removably mounted on the link 230 which bears against the inside of a slot 233 in the receptor body 224. Removal of the stop pin 242 allows counterclockwise, downwardly, forward rotation of the link 230 and convenient replacement of the elastomer block 250. Note that in this third embodiment the top of the elastomer block 250 is oriented at an angle of about 45° to the horizontal. This orientation of the elastomer block allows use of a larger diameter wheel without raising the overall height of the suspension system.

Figure 8:
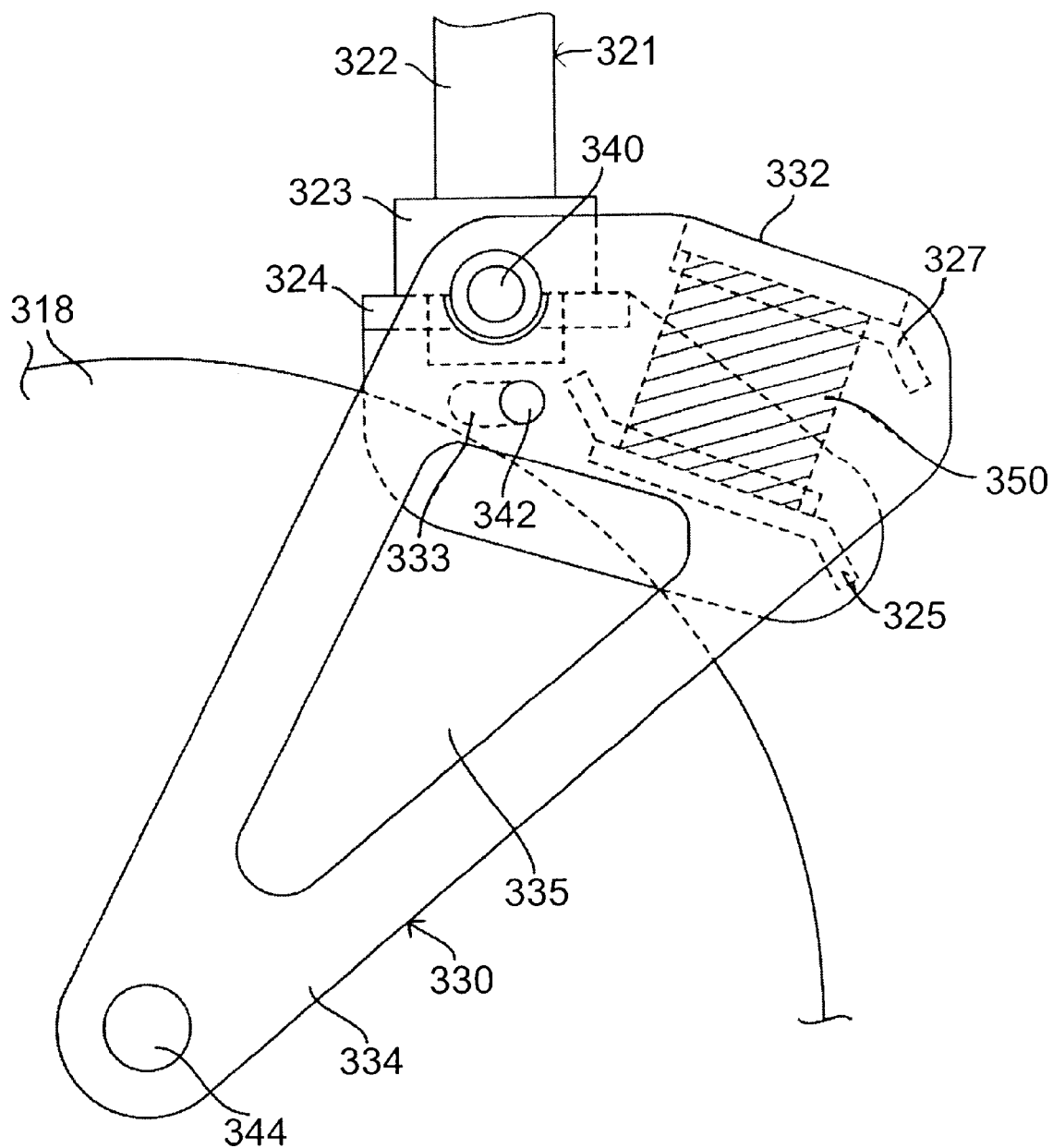
FIG. 8 is a side view of the fourth embodiment small wheel suspension system.
Figure 9:
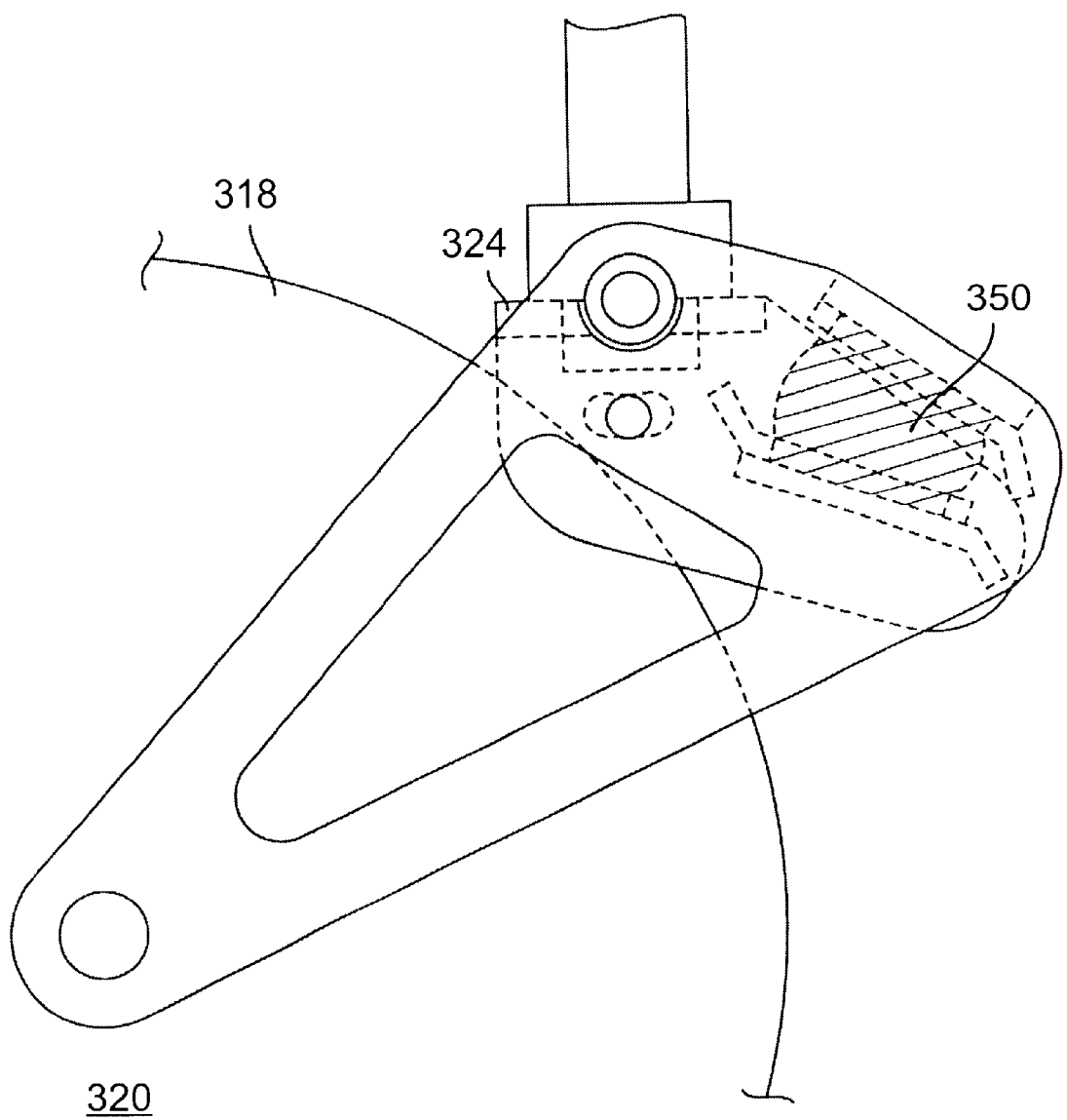
FIG. 9 is a side view of the fourth embodiment small wheel suspension system after deflection.

FIG. 8 is a side view of the fourth embodiment suspension system 320 which includes the wheel 318. The stembolt 322 of the receptor 321 is shown connected to the stembolt head 323 which is connected to the receptor body 324. The link back 332 connects the right arm 334 and left arm (not shown in FIG. 8). The elastomer block 350 is shown with dashed lines because it is covered by the link 330 and is trapped between the link 330 and receptor body 324. Dashed lines also depict the link elastomer block seat 327 and the receptor elastomer block seat 325. The link 330 is shown with right arm 334 and axle hole 344, wheel 318 and cutout 335. The link 330 is pivotally attached to the receptor body 324 by the pivot pin 340. The counterclockwise rotation of the link 330 downwardly or forwardly is limited by the stop pin 342 removably mounted on the link 330 which bears against the inside of a stop pin slot 333 in the receptor body 324. Removal of the stop pin 342 allows counterclockwise, downwardly, forward rotation of the link 330 and convenient replacement of the elastomer block 350. Note that in this fourth embodiment the top of the elastomer block 350 is oriented at an angle of about 45° to the horizontal. This orientation of the elastomer block allows use of a larger diameter wheel without raising the overall height of the suspension system. It should also be noted that the pivot pin 340 is located directly below the stembolt 322 and the stembolt head 323. This location of the pivot pin tends to raise the total height of the suspension system, as compared to the first, second, and third embodiments, but has the desirable effect of allowing the use of larger wheels which can deflect without hitting the receptor. For example, FIG. 9 shows an 8" diameter wheel. The wheel is shown entering into the channel formed by the receptor body 324, shown in detail in FIG. 11D.

FIG. 10 is the same as FIG. 9 except the wheel 318 is shown after deflection of 15°. Note that the wheel 318 does not contact the receptor body 324 even under this degree of deflection. Also shown is the compression and distortion of the elastomer block 350 under deflection.

FIGS. 10A–E and 11A–E show the details of the fourth embodiment link 330 and receptor body 324, respectively. These elements can be constructed in a variety of methods, such as forming or bending, casting, extrusion, of a variety of materials, such as steel, aluminum, and plastic polymers. A preferred method and material of construction for embodiment four link and receptor body is forming or bending of sheet steel.

Figure 10A:
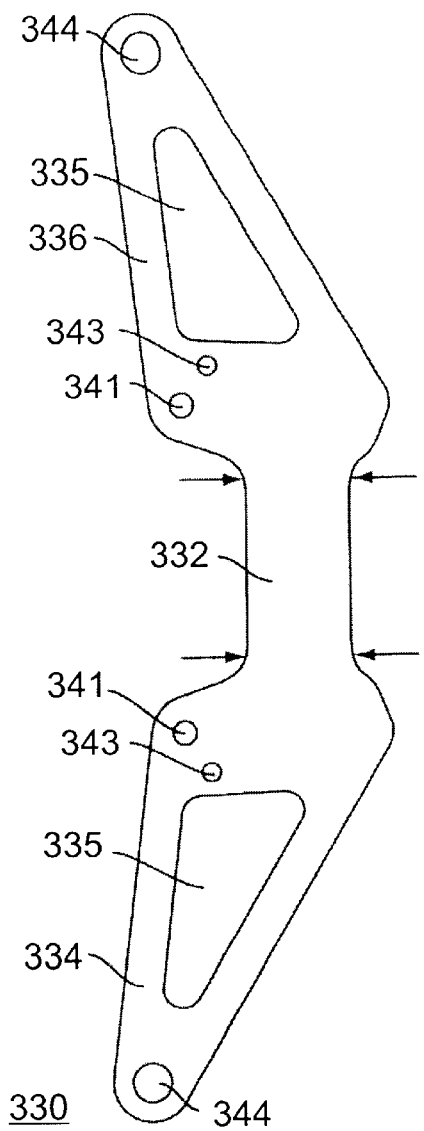
FIG. 10A is a plan view of the fourth embodiment small wheel suspension system link before shaping.

FIG. 10A is a plan view of the link 330 in its unformed state, as a flat sheet of steel. Visible in the right arm 334 are the cutout 335, the pivot pin hole 341, and the stop pin hole 343. Similar elements are visible in the left arm 336. The arms are connected by the link back 332. The link is made by integral construction from a single piece of material.

Figure 10B:
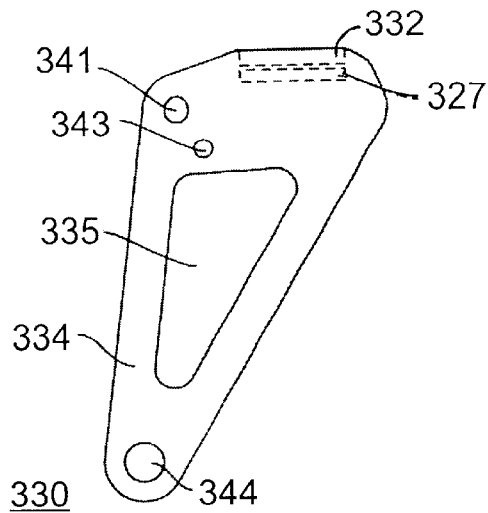
FIG. 10B is a side view of the fourth embodiment small wheel suspension system link after shaping.

FIG. 10B is a side view of the link 320 after bending at the arrows at the intersections of arms 334 and 336 and link back 332 of FIG. 10A. The same elements shown on the right arm 334 of FIG. 10A are shown on the right arm 334 of FIG. 10B. In addition, the link elastomer block holder 327 is welded or otherwise attached to the link to back 327 between the arms and is shown in dotted lines.

Figure 10C:
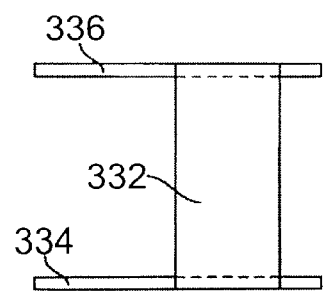
FIG. 10C is a top view of the fourth embodiment small wheel suspension system link after shaping.

FIG. 10C is a top view of the formed link showing the right arm 334 and left arm 336 connected by the link back 332.

Figure 10E:
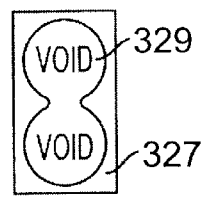
FIG. 10E is a plan view of the fourth embodiment small wheel suspension system link elastomer block support web.
Figure 10D:
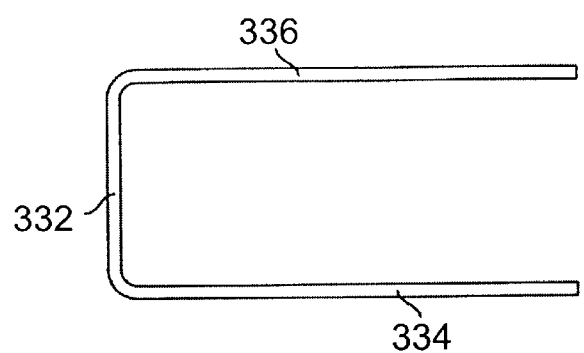
FIG. 10D is an end view of the fourth embodiment small wheel suspension system link after shaping.

FIG. 10D is an end view of the link showing the ends of the right arm 334, left arm 336, and link back 332.

FIG. 10E is a plan view of the link elastomer block holder 327 showing the machined depression 329 in which the elastomer block is seated.

Figure 11A:
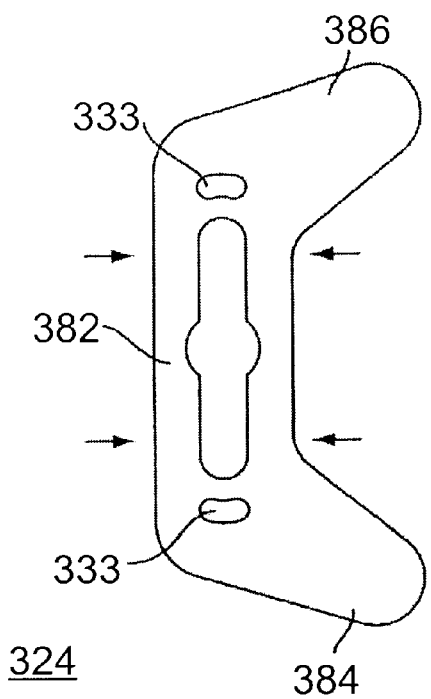
FIG. 11A is a plan view of the fourth embodiment small wheel suspension system receptor before shaping.

FIG. 11A is a plan view of the receptor body 324 in its unformed state, as a flat sheet of steel. Visible in the right arm 384 is the stop pin slot 383. A similar element is visible in the left arm 386. The arms are connected by the receptor body back 382. The receptor body is made by integral construction from a single piece of material.

Figure 11B:
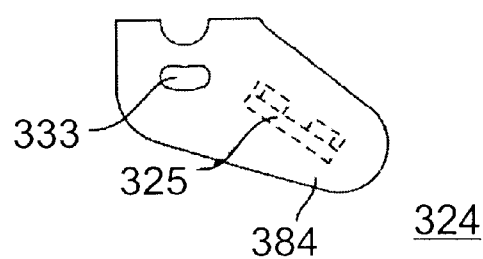
FIG. 11B is a side view of the fourth embodiment small wheel suspension system receptor after shaping.

FIG. 11B is a side view of the receptor body 324 after bending at the arrows at the intersections of arms 384 and 386 and receptor body back 382 of FIG. 11A. The same stop pin slot 333 on the right arm 384 of FIG. 11A is shown on the right arm 384 of FIG. 11B. In addition, the elastomer block holder 325 is welded or otherwise attached between the right arm 384 and left arm 386 and is shown in dotted lines.

Figure 11C:
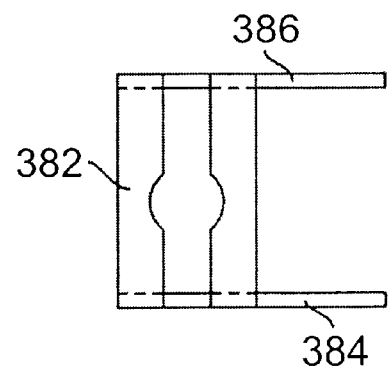
FIG. 11C is a top view of the fourth embodiment small wheel suspension system receptor after shaping.

FIG. 11C is a top view of the formed receptor body showing the right arm 384 and left arm 386 connected by the receptor body back 382.

Figure 11E:
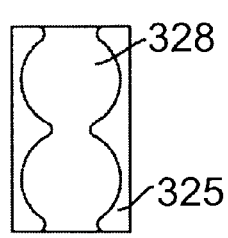
FIG. 11E is a plan view of the fourth embodiment small wheel suspension system receptor elastomer block support web.
Figure 11D:
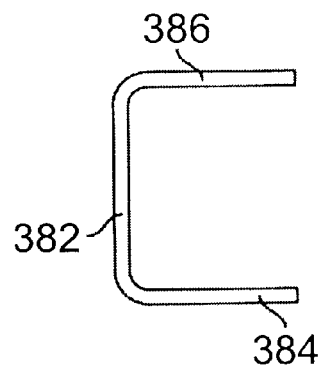
FIG. 11D is an end view of the fourth embodiment small wheel suspension system receptor after shaping.

FIG. 11D is an end view of the receptor body showing the ends of the right arm 384, left arm 386, and link back 382.

FIG. 11E is a plan view of the receptor body elastomer block holder 325 showing the machined depression 328 in which the elastomer block is seated.

The various embodiments of the suspension system are constructed of suitable strong, light, abrasion resistant materials. The wheel is constructed of materials such as rubber, synthetic rubber or polymers. A preferred material of construction of the wheel is polyurethane. The link is constructed of materials such as aluminum, steel, plastic or fiberglass. A preferred material for the link is aluminum and a second preferred material is steel. The receptor is constructed of materials such aluminum, steel, plastic or fiberglass. A preferred material for the receptor is aluminum and a second preferred material is steel. The elastomer block is constructed of polyurethane, natural rubber, synthetic rubber, steel spring, or a bladder filled with compressible material. A preferred material for the elastomer block is polyurethane. Although the embodiments illustrated in this patent application show only one elastomer block installed in each suspension system, it is possible to combine more than one elastomer block in each system.

The suspension system of the present invention was designed to solve problems with prior art suspension systems associated with the height of the suspension system, the trail of the front wheels, the leading edge of the suspension system and the ease of tuning of the suspension system.

The higher the front suspension system including the front wheel, the greater the instability of the wheelchair, and the greater the chance of pitching forward or tipping over. On the other hand, larger front wheels are better able to contend with rocks, holes, and uneven pavement than are smaller front wheels. In general, relatively larger wheels are preferred for power wheelchairs, where the wheels are often located at the rear of the chair. It is important to use small wheels of maximum diameter while minimizing the height of the combined wheel--suspension system. In prior art suspensions, the elastomer block is located directly between the wheel and the stembolt and increases the height of the suspension system. The present invention achieves the goal of lowering the total suspension height by placing the elastomer block toward the front of the system, rather than below the stembolt. The present invention can accommodate 3", 4" or 5" diameter wheels while maintaining a 6" stembolt to ground height. Even larger wheels, with a diameter of 8" or 9", may be used with the fourth embodiment suspension system of this invention.

In a suspension system with "trail", the wheel axle is not located directly below the stembolt. When the wheelchair moves, the receptor swivels so that the wheel axle is behind the stembolt. If the chair is moving forward, the wheel trails behind the stembolt. If the chair is moving backward, the receptor swivels so the wheel is at the front side of the chair, but still is trailing the direction of movement of the chair. Trail has the desirable effect of reducing the height of the wheel-suspension system because it means that the wheel axle need not be directly below the stembolt. It also keeps the wheel from wobbling and makes the wheel track straight. Excessive trail, however, is undesirable because trail removes support from the front of the wheelchair (or rear of the wheelchair when the small wheels are at the rear). The effect of trail is to move the front wheel axles toward the rear wheel axles. This shortens the wheelbase and increases the instability of the chair. The suspension system of this invention minimizes the suspension height while maintaining stability of the chair by providing a modest amount of trail. Excessive trail also requires a larger clear area for the wheels to swing through, clear of obstructions such as a user's foot. Excessive trail may cause the wheel to contact the rider's foot when the chair is turning.

The use of trail necessarily requires that the front or leading edge of the suspension will always be presented to obstacles in front of the wheelchair. The present invention has a rounded, smooth suspension front or leading edge. This is important to minimize damage to furniture, counters, and wall from inadvertent collision with the front of the suspension system. In addition, the mounting of the elastomer block in the various embodiments of this invention reduces the amount of extension at the forward edge, which is exposed to inadvertent collision.

It is important that the wheelchair suspension be "tuned" or adjusted to the individual characteristics of the owner. Tuning is accomplished by adjusting the properties of the elastomer block or by changing the size or properties of the small wheels. Ease of tuning is critical.

The present invention suspension easily is tuned by replacing an elastomer block with one of greater or lesser rigidity, and by replacing an elastomer block when it is worn out with the loss of resilience or elasticity. Replacement of the elastomer block of the first embodiment is accomplished simply by withdrawing the stop pin and by swinging the link in a counter-clockwise downward or forward direction, thereby releasing the elastomer block. The link is swung in the clockwise upward or backward direction to secure the new elastomer block and the stop pin is replaced. In the second to fourth embodiments a similar procedure is used to replace the elastomer block. The stop pin is withdrawn and the link swung in a counter-clockwise downward or forward direction. The elastomer block is removed and a new one inserted. The link is swung in the clockwise upward or backward direction and the stop pin replaced.

Tuning is also accomplished by altering the properties of the small wheels. The performance characteristics and the height of the wheelchair can be altered by the location of the wheel axle on the link or by using wheels of a variety of diameters. The wheelchair may be further tuned by using wheel of differing properties varying, for example, in resilience or in resistance to slippage, in order to obtain a wheelchair with riding characteristics adapted to the requirements of the individual user.

It will be understood that although the foregoing invention has been described by way of illustration and example, that this is for clarity of understanding, and that there exists a variety of imaginable changes and modification that may be practiced within the appended claims.

I claim:

1. A suspension system for wheelchairs, the wheelchairs having a chassis and the chassis having a forward end, a rearward end, a top, and a bottom, comprising:

a receptor having an upper portion and a lower portion, the upper portion of the receptor being adapted to be attached to the forward bottom end of said chassis, said upper portion of the receptor being vertical and the lower portion of said receptor being bent into the general shape of a "U" with the "U" having a back which connects with said upper portion of said receptor and forward arms which are forward of said upper portion of said receptor, and the forward arms of the "U" of said lower portion of said receptor angled forwardly and downwardly from the vertical upper portion, pivot means affixed to said receptor at a point between said upper portion of said receptor and said lower portion of said receptor, and a bottom link having an upper portion and a lower portion, the bottom link being pivotally attached to said receptor by the pivot means such that said receptor and said bottom link may move in a scissors fashion, the upper portion of said bottom link being above said pivot means and the lower portion of said bottom link being below said pivot means, said upper portion of said bottom link being parallel, or nearly parallel, to the forward leg of the "U" of said lower portion of said receptor, and said lower portion of said bottom link being adapted to be affixed to an axle and wheel, and spring means interposed between said upper portion of said bottom link and the forward arms of the "U" of said lower portion of said receptor such that the spring means tends to force said upper portion of said bottom link away from the forward arms of the "U" of said lower portion of said receptor.

2. The suspension system of claim 1 wherein the spring means is positioned forward of said upper portion of said receptor.

3. The suspension system of claim 1 further comprising: a removable stop pin holding the receptor and the bottom link together and retaining the spring means therebetween.

4. The suspension system of claim 1 wherein the spring means is comprised of synthetic elastomer, rubber, a spring constructed of strong, resilient material, polyurethane, or a bladder filled with compressible material.

5. The suspension system of claim 1 wherein said receptor is adapted to be attached to the rearward bottom end of said chassis.

6. The suspension system of claim 1 further comprising has a vertical receiver with a hollow core and said upper portion of said receptor fits within the vertical receiver and may revolve about the vertical axis of said vertical receiver.

* * * * *